Sept. 21, 1926.

H. G. DORSEY 1,600,870

RECEIVING SYSTEM FOR RADIANT ENERGY

Filed Oct. 22, 1919     2 Sheets-Sheet 1

INVENTOR
Herbert G. Dorsey
BY
A. I. Gardner
HIS ATTORNEY

Sept. 21, 1926.

H. G. DORSEY 1,600,870

RECEIVING SYSTEM FOR RADIANT ENERGY

Filed Oct. 22, 1919   2 Sheets-Sheet 2

Clock Controlling Circuit 80.

INVENTOR
Herbert G. Dorsey
BY
A. J. Gardner
HIS ATTORNEY

Patented Sept. 21, 1926.

1,600,870

UNITED STATES PATENT OFFICE.

HERBERT GROVE DORSEY, OF GLOUCESTER, MASSACHUSETTS, ASSIGNOR TO JOHN HAYS HAMMOND, JR., OF GLOUCESTER, MASSACHUSETTS.

RECEIVING SYSTEM FOR RADIANT ENERGY.

Application filed October 22, 1919. Serial No. 332,453.

Some of the objects of the present invention are to provide means for preventing interference in signalling; to provide means to prevent an intense signal of incorrect frequency from causing a responsive device to be actuated; to provide a mechanism for use with a sound controlled signal system to prevent other than a signal of predetermined frequency from operating said system; to provide means for causing a sound receiver to respond only to signals of a predetermined frequency; to provide means for causing a system to be actuated by sound signals of a predetermined frequency and to be rendered inoperative upon the receipt of signals of a different frequency; and to provide other improvements as will hereinafter appear.

Figure 5:
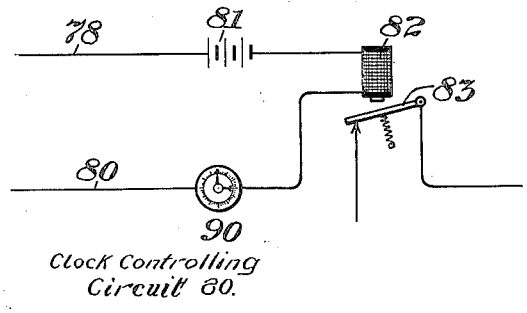
Figure 2:
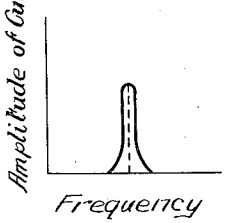
Figure 3:
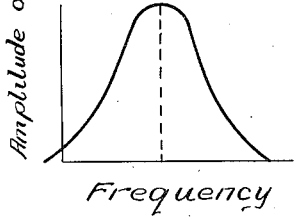
Figure 4:
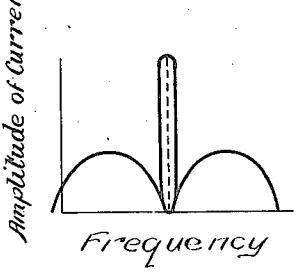

In the accompanying drawings, Fig. 1 represents diagrammatically one form of receiving apparatus for the prevention of interference in signalling, and including partial sections of certain parts for the sake of clearness; Figs. 2, 3 and 4 are sound wave diagrams explanatory of the operation of the system; and Fig. 5 represents a modified form having a time control.

Referring to the drawings, one form of a system for preventing interference in signalling is shown in Fig. 1 applied to a sound wave receiving apparatus for operating the steering control of a movable body such as a distantly controlled torpedo. The receiving apparatus here chosen for purposes of illustration forms the subject matter of my copending application Serial No. 241,330, and since it is there fully described in detail, only a general outline of the parts is here deemed necessary.

For directing the movement of the torpedo or other suitable marine vessel, a steering control 10 is operatively mounted upon the torpedo and is arranged to be operated by a solenoid 11 included in a control circuit 12 energized by a battery 13 and having a circuit closing device in the form of a relay 14, which is energized by a circuit 15 including a battery 16, a direct current micro-ammeter 17, and a telephone receiver 18.

For receiving the selected signal and utilizing it to control the steering control circuit 12, an electrical oscillator 20 is employed having a vibratory diaphragm 21 mounted in an opening of the torpedo body or its rudder, as desired, and arranged to control and operate the receiving apparatus. The diaphragm 21 is tuned to the predetermined frequency of vibration of the transmitting diaphragm, which sends out the sound waves for purposes of control, and when vibrating, electrical oscillations are set up in a circuit 22 which comprises part of a system including three detectors or amplifiers 23, 24 and 25. These amplifiers may be of a well known construction comprising respectively an evacuated glass bulb 26, containing a filament or heater 27, a grid 30 and a plate 31. The three filaments 27 are arranged to be heated by a common battery 32. The three amplifiers are arranged to be controlled by the circuit 22 which includes a main inductance 33 and an auxiliary inductance 34. The main inductance 33 forms the primary of a step-up transformer 35 which is in a closed oscillatory circuit 36 including a variable condenser 40 and which is tuned to the predetermined frequency of the electrical oscillations on the circuit 22. This closed circuit 36 is arranged to control the first amplifier 23, one side of the variable condenser 40 being connected to the grid 30 of the amplifier 23 through a stoppage condenser 37 and the other side of the variable condenser 40 being connected to the corresponding filament 27. The amplifier 23 controls a circuit including a battery 41 and an inductance 42, this latter forming the primary of an autotransformer having a secondary inductance 43 which is in a closed oscillatory circuit 44 including a variable condenser 45. This circuit 44 is tuned to the predetermined frequency of the oscillations set up by the electrical oscillator in the circuit 33 and is arranged to act through a stoppage condenser 46 to control the second amplifier 24.

The amplifier 24 controls a circuit including a battery 50 and an inductance 51 which forms the primary of an autotransformer which has a secondary inductance 52 which is in a closed oscillatory circuit 53 including a variable condenser 54. This closed circuit 53 is timed to the same predetermined frequency as the other closed oscillatory circuits 36 and 44 and is arranged to act through a stoppage condenser 55 to control the third amplifier 25. The third amplifier 25 controls the circuit 15, which as already explained actuates the relay 14 for operating the steering control circuit 12.

As the present invention acts upon the control circuit 12, and that portion of the receiving system which transmits the signal to the said circuit 12 has been described it is thought unnecessary to here take up further details of the receiving apparatus which embody features for increasing the sensibility of the system, particularly as these form the subject matter of the above mentioned copending application. Another reason for condensing this description is that the system illustrated is only one of many to which the present invention is applicable, and therefore the form of interference prevention shown in Fig. 1 will now be taken up.

In any receiving system of the type above described the receiver may be so sharply tuned that weak signals of any frequency other than that for which it is tuned will not operate it, yet when a very intense signal of incorrect frequency acts upon the receiver it is almost impossible to prevent the vibrating system from being forced to respond to the incorrect frequency with the result of improperly operating the steering mechanism.

As one means of preventing such operation in response to an intense signal of incorrect frequency two separate sound receiving and sound producing devices 60 and 61 are provided, both of like construction so that but one will be described in detail, and similar numerals of reference applied to like parts in the other. Each of the tubes 60 and 61 is provided with an electrical oscillator 62 mounted for sliding movement at one end of its respective tube, the said oscillator 62 being so arranged as to tightly close the end of the tube. These oscillators 62 may be of any suitable or well known type but are preferably of the form employed in the main receiving system as shown in Fig. 1 at 20.

For transmitting oscillations to the two oscillators 62, they are connected in series by two conductors 64 and 65 with the circuit 15 so that oscillations set up in that circuit will be transmitted to both of the electrical oscillators 62.

In order to adjust the oscillator 62 with respect to its tube, the oscillator is provided with a rack 66 accessible by way of a slot in the tube and operated by a pinion 67 rotatably mounted in suitably fixed bearings on the tube. The pinion 67 may be rotated by a thumb-wheel 68 fixed to the pinion stem 69.

The end of the tube opposite to the oscillator 62 is closed by a movable plunger 70 arranged to tightly close the tube and adjustable in order to vary the length of the tube with respect to the length of the transmitted sound wave. This adjustment is made by a similar mechanism to that employed for the oscillators, consisting of a rack 71, pinion 72 and thumb-wheel 73 as will be readily understood.

For causing the sound waves produced in the respective tubes 60 and 61 to control the signal circuit 12, a relatively thin disc 74 of mica or any other suitable material is delicately suspended or pivoted in the tube at a point coincident with the crest of the sound wave traversing the tube. This disc 74 is normally held by a light spring 75 at an angle of approximately 45° to the direction of sound propagation. It is well known that a disc of this character when suspended at the crest of a sound wave, namely the middle of the present tube, it tends to rotate in such a direction as to close the tube and, in the present instance, this action is utilized to close an auxiliary circuit 76 by electrically connecting a contact 77 on the disc 74 with one of the conductors 78 of the circuit 76 and locating the contact 77 in such a position upon the disc 74 as to engage a fixed terminal 79 of the other conductor 80 of the circuit 76. The circuit 76 includes a battery 81 and relay 82, the armature 83 of this latter being arranged to open and close the signal circuit 12 according to conditions. Under normal conditions the armature 83 maintains the second break in the circuit 12 closed so that the circuit is responsive to the relay 14, but when the relay 82 is energized the circuit 12 is broken and will not respond to the relay 14. The two disc controlled contacts are connected in parallel with the circuit 76 so that operation of either of the discs 74 will close the auxiliary circuit 76 and actuate the relay 82.

For obtaining the best results the length of each of the tubes 60 and 61, that is the distance between each oscillator 62 and each plunger 70, should be a half wave length to the frequency to which the oscillators are tuned respectively, thus giving a node at each end of the tube and a crest at the middle where the discs 74 are located. If desired the tube lengths may be any odd number of half way lengths as $1/2\ \lambda$, $3/2\ \lambda$, $5/2\ \lambda$, etc. where lambda represents a whole wave length.

The oscillators 62 of the respective tubes 60 and 61 are tuned to different frequencies the one, say of tube 60, having a frequency less than the predetermined frequency of the receiving system and the other having a frequency greater than the predetermined frequency of the receiving system.

In describing the operation of the invention it will be assumed for purposes of illustration that the selected or predetermined frequency of the receiving system is 540 cycles and that the oscillator of the tube 60 is tuned to 520 cycles and the oscillator of the tube 61 is tuned to 560 cycles. Now as the torpedo, equipped with the present system, comes into close proximity to the enemy it meets sound waves sent out by the enemy to cause interference and since the source of sound is near the sharp tuning of the receiving system no longer avails and instead of having a curve like that of Fig. 2, the curve is like that of Fig. 3. Since all of the amplified sound passes through the oscillators of the tubes 60 and 61, the discs 74 will swing to closed position whenever the sound becomes sufficiently intense and thereby open the circuit 76 to prevent interference with the steering control. An advantage of this construction is that the greater the sound in the tubes 60 and 61, the broader their tuning, so that for very strong signals the discs 74 would open the circuit 76 over a range, say, of 18 cycles, thus leaving the effective range of tuning set which the steering apparatus would work only 2 cycles either side of 540 or a total of 4 cycles. This condition is illustrated in the diagram of Fig. 4. Signals stronger than this will cause the tuning to overlap so that when very close to the enemy sound transmitter the steering control would not work at all. While but two interference tubes are here shown it will be understood that any number can be put in series and multiple as shown and cut out interference over any desired range.

In Fig. 5 a modification is shown whereby the operator of the torpedo can steer it while still at close range and still prevent interference by the enemy. In this form a clock controlled switch 90 or other suitable mechanism is included in the circuit 76 and is so arranged as to maintain the circuit 76 open, say, for 10 seconds after the torpedo has been fired, then after the torpedo has gone, say, 1000 yards the clock 90 would close the circuit 76. By this construction the interference preventing devices are cut out so that even were the discs 74 rotated by the strong signals produced by the operator, they would not prevent the steering mechanism from being worked.

A further advantage of this system of prevention is that it does not reduce the sensibility to weak signals to any degree whatever as the two oscillators only add a few hundred ohms to the plate circuit of the last amplifier 25.

Having thus described my invention, I claim and desire to protect by Letters Patent of the United States:

1. In a receiving system for oscillatory energy, the combination of a mechanism arranged to be controlled by a signal of oscillatory energy having a predetermined frequency, a control arrangement for said mechanism, and means controlled by said control arrangement and responsive only to relatively strong impulses of oscillatory energy having a frequency different from said predetermined frequency to cause said mechanism to be unresponsive.

2. In a receiving system for oscillatory energy, the combination of a mechanism arranged to be controlled by sound waves having a predetermined frequency, a control arrangement for said mechanism, and means controlled by said control arrangement and responsive only to relatively strong sound wave impulses having a different frequency from said predetermined frequency to cause said mechanism to be unresponsive.

3. In a receiving system for radiant energy, the combination of a control mechanism, an operating circuit for said mechanism, means responsive to a signal of predetermined frequency for causing said circuit to operate said control mechanism, and means controlled by said first mentioned means, and responsive to a different frequency for causing said circuit to be inoperative to control said mechanism.

4. In a receiving system for radiant energy, the combination of a control mechanism, an operating circuit for said mechanism, means responsive to a signal of predetermined frequency for closing said circuit to operate said control mechanism, and means controlled by said first mentioned means, and responsive to a different frequency to open said circuit to prevent operation of said control mechanism by said different frequency.

5. In a receiving system for radiant energy, the combination of a control mechanism, an operating circuit for said mechanism, means responsive to a signal of predetermined frequency for closing said circuit to operate said control mechanism, and means controlled by said first mentioned means, and including an electromagnetic sound oscillator tuned to a different frequency to open said circuit in response to a signal of said different frequency to prevent operation of said control mechanism.

6. In a receiving system for radiant energy, the combination of a control mechanism, an operating circuit for said mechanism, means responsive to a signal of predetermined frequency for closing said circuit to operate said control mechanism, and means controlled by said first mentioned means, and including a plurality of electromagnetic oscillators tuned respectively to frequencies above and below said predetermined frequency to open said circuit in response to signals having a frequency different from said predetermined frequency to prevent operation of said control mechanism.

7. In a receiving system for radiant energy, the combination of a control mechanism, an operating circuit for said mechanism, means responsive to a signal of predetermined frequency for closing said circuit to operate said control mechanism, means controlled by said first mentioned means and including a movable member operated by sound waves for breaking said circuit, and means controlled by said first mentioned means, and responsive only to signals of a frequency different from said predetermined frequency for producing said sound waves.

8. In a receiving system for radiant energy, the combination of a control mechanism, an operating circuit for said mechanism, means responsive to a signal of predetermined frequency for closing said circuit to operate said control mechanism, means including a plurality of movable members operated by sound waves for breaking said circuit, and a plurality of devices controlled by said first mentioned means for producing said sound waves, said devices being responsive respectively only to frequencies different from said predetermined frequency.

9. In a receiving system for radiant energy, the combination of a control mechanism, an operating circuit for said mechanism, means responsive to a signal of predetermined frequency for closing said circuit to operate said control mechanism, means controlled by said first mentioned means, and including a plurality of movable members operated by sound waves for breaking said circuit, and separate means for causing each movable member to operate, each of said separate means being responsive to a frequency different from the other and all of said frequencies being different from said predetermined frequency.

10. In a receiving system for oscillatory energy, the combination with a device to be actuated by received energy of a control circuit for controlling said device, an element responsive to oscillatory impulses of a predetermined frequency for controlling said circuit, an auxiliary circuit controlled by said element and means controlled by said auxiliary circuit for rendering said control circuit ineffective to control said device when said element receives impulses having a frequency different from said first mentioned frequency.

11. In a receiving system for oscillatory energy, the combination with a device, to be actuated by received energy of a control circuit for controlling said device, an element responsive to oscillatory impulses of a predetermined frequency for controlling said circuit, an auxiliary circuit controlled by said element and means controlled by said auxiliary circuit for rendering said control circuit ineffective to control said receiving device when said element receives impulses having a frequency either greater or less than said first mentioned frequency within certain limits.

12. A system for receiving oscillatory energy including a device to be actuated by received energy, a control circuit for controlling said device, an element responsive to oscillatory impulses of a predetermined frequency and means co-operating therewith for controlling said control circuit, a device tuned to respond only to sound waves of a frequency different from said first mentioned frequency and means controlled by said device and continuously operable to control said control circuit.

13. A system for receiving oscillatory energy including a device, to be actuated by received energy a control circuit for controlling said device, an element responsive to impulses of a predetermined frequency and means co-operating therewith for controlling said control circuit, a plurality of devices tuned to respond respectively only to sound waves of a frequency different from said first mentioned frequency, and means controlled by said sound devices and continuously operable to control said control circuit.

14. A system for receiving oscillatory energy including a device to be actuated by received energy, a control circuit for controlling said device, an element responsive to impulses of a predetermined frequency and means co-operating therewith for controlling said control circuit, a plurality of devices tuned to respond respectively to sound waves of a frequency different from said first mentioned frequency, and different from each other and means controlled by said sound devices and continuously operable to control said control circuit.

In witness whereof I have hereunto set my hand this tenth day of October, 1919.

HERBERT GROVE DORSEY.